INVENTORS
ARTHUR T. LEUNG
JAMES W. VAUGHAN

United States Patent Office 3,552,865
Patented Jan. 5, 1971

3,552,865
HIGH PRESSURE FLOW-THROUGH CUVETTE
Arthur T. Leung, Palo Alto, and James W. Vaughan, Los Altos, Calif., assignors to Beckman Instruments, Inc., a corporation of California
Filed Apr. 1, 1968, Ser. No. 717,706
Int. Cl. G01n 1/10
U.S. Cl. 356—246                                   2 Claims

ABSTRACT OF THE DISCLOSURE

A cuvette for monitoring a flowing liquid stream including a flow cell assembly enclosed within a light opaque housing. The flow cell assembly includes a slender or narrow gasket member having an oval shaped aperture formed therein sandwiched between a pair of light transparent plates. The aperture formed in the gasket member is lined by an O-ring seal and bonded on either side by the inner face of each plate to define an analyzing chamber having a sufficiently small cross-section or thickness to permit a relative viscous liquid stream to freely flow through the chamber without any danger of turbulence or trapping of air bubbles contained in the stream. One of the transparent plates includes inlet and outlet passageways communicating with the analyzing chamber through which the liquid stream is continuously fed into and removed from the chamber. The housing serves to clamp or tightly hold the slender gasket firmly between the pair of transparent plates and is provided with a pair of apertures axially aligned with each other and the flow cell assembly to provide a light path orthogonal to the direction of liquid flow along which a light beam of a selected wavelength is transmitted.

BACKGROUND OF THE INVENTION

This invention relates in general to optical analyzing apparatus and more particularly to a cuvette assembly for continuously analyzing a flowing liquid sample.

In many fields, such as chromatography or sample investigation by centrifugation, it is frequently necessary to continuously analyze a liquid effluent by monitoring the nature and quantity of its constituents. Typically, such analysis is carried out by passing a liquid stream through a flow cell cuvette and transmitting through the cuvette a light beam of a selected wavelength. The amount of absorption of the light beam is then monitored by a suitable photodetector to measure the concentration of the various constituents contained in the liquid sample.

In the interest of accuracy, the flow cell or analyzing chamber through which the liquid sample flows should be constructed so as to eliminate to the extent possible any dead spaces in which air bubbles present in the liquid stream may become trapped to thereby adversely affect the colorimetric examination of the stream. Moreover, in examining samples carried by relative viscous solutions, such as sample fractions suspended in a density gradient liquid stream, it is desirable that the liquid stream does not undergo any mixing. That is to say, any turbulence remixes the previously separated sample fractions thereby destroying their identity.

SUMMARY

The present invention contemplates a cuvette assembly including a flow cell having an analyzing chamber with a sufficiently small cross-section or thickness to permit air bubbles contained in the liquid stream being examined to be continuously swept through the chamber without becoming lodged therein while at the same time keeping turbulence of the flowing liquid stream to a minimum.

To this end, in accordance with the principles of the present invention there is provided a flow cell assembly comprising a slender gasket member sandwiched between a pair of transparent plates. The gasket member is provided with an oval shaped aperture which is bounded on either side by the inner face of each transparent plate to define an analyzing chamber having a narrow cross-section or thickness. One of the plates includes inlet and outlet passageways communicating with the analyzing chamber for introducing and removing the liquid sample stream from the chamber. The flow cell is housed in a housing formed of a light opaque material which serves to clamp or press together the components of the flow cell to firmly hold the gasket member between the pair of transparent plates. The housing also includes a pair of apertures axially aligned with each other and the flow cell assembly to provide a light path orthogonal to the direction of liquid flow.

Accordingly, a primary object of the present invention is the provision of an inexpensive and compact cuvette assembly.

Another object is the provision of a flow cell having an analyzing chamber with a sufficiently narrow cross-section to permit air bubbles to be easily swept through the chamber.

Still another object is the provision of a flow cell having an analyzing chamber with a sufficiently narrow cross-section or thickness to prevent turbulence of a viscous liquid sample stream as it flows through the chamber.

These and other objects and advantages of the present invention will become apparent from the following detailed description when read in conjunction with the accompanying drawings in which.

Figure 1:
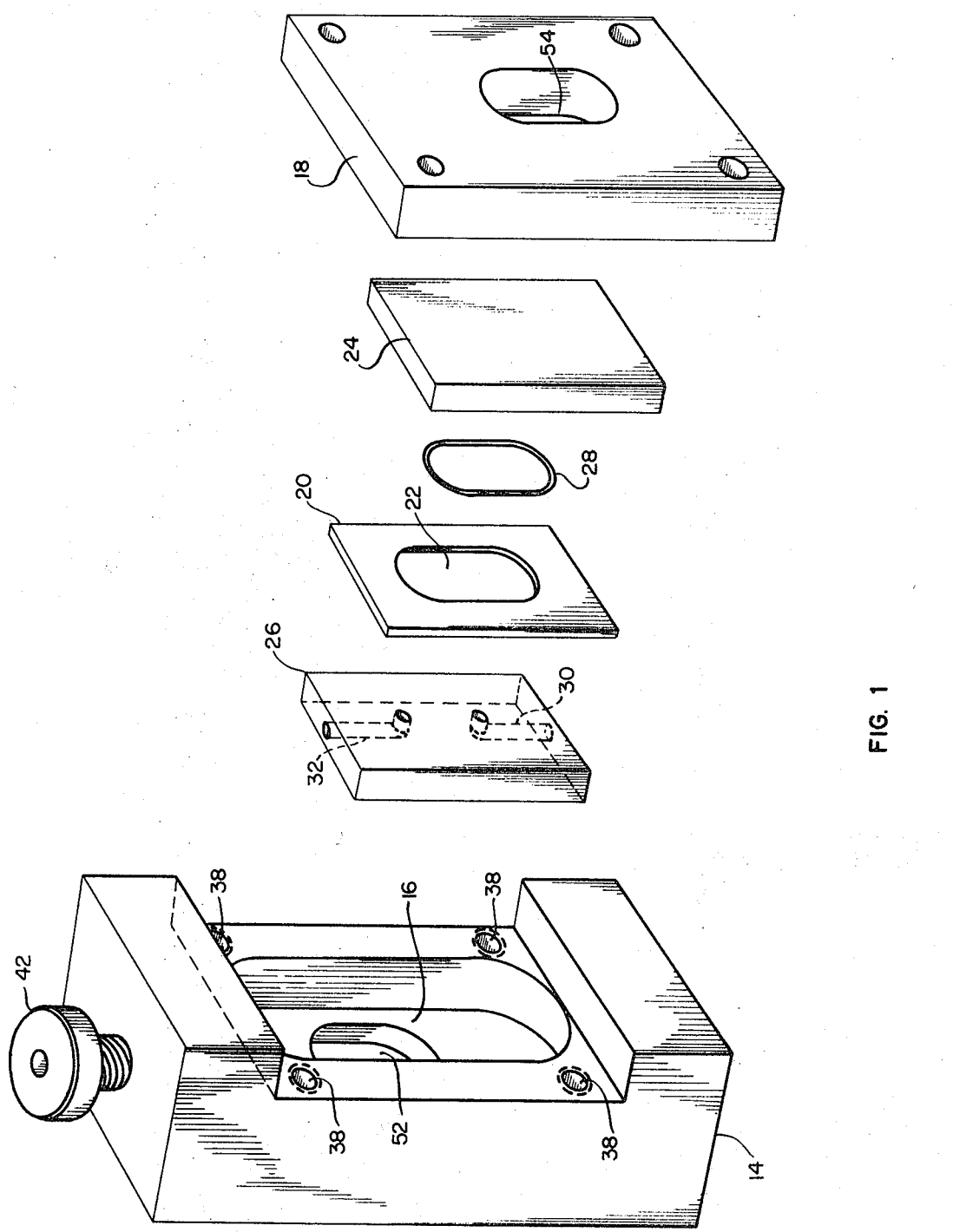
FIG. 1 is a partially exploded perspective view illustrating the flow cell and housing forming the cuvette assembly.
Figure 2:
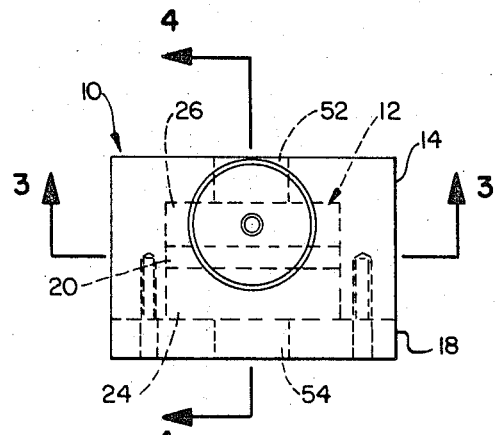
FIG. 2 is a top view of the assembled flow cell and housing.

With reference now to the drawings and more particularly to FIGS. 1 and 2 thereof, it will be observed that the reference numeral 12 designates in general a flow cell assembly which is enclosed within a generally rectangular housing 10 formed of a suitable light opaque material, such as aluminum. The housing 10 comprises a generally U-shaped holder portion 14 the middle arm of which includes a generally oval shaped recess 16 dimensioned to receive flow cell assembly 12 and a rectangular cover plate 18 which fits over the oval recess 16. The flow cell assembly 12, as may be readily seen in FIG. 1, comprises a narrow or slender gasket member 20 having a generally oval shaped aperture 22 sandwiched between a pair of generally rectangular light transparent plates 24 and 26. In practice, the transparent plates 24 and 26 are typically fabricated of quartz while the narrow gasket member 20 is made of Teflon. Aperture 22 is lined about its periphery with a suitable O-ring seal 28 and bounded on either side by the inner faces of transparent plates 24 and 26 to define an analyzing chamber having a narrow cross-section through which the liquid stream being examined is transmitted. Thus the size of the aperture 22 determines the volume of the analyzing chamber. Plate 26 is provided with a small cylindrical L-shaped inlet passageway 30 and a similarly shaped outlet passageway 32, both of which communicate with the analyzing chamber to feed the liquid sample into and remove it from the chamber in a continuous stream. Of course, it will be appreciated that both or one of these latter passageways may be formed in plate 24 instead of plate 26 as ilustrated.

It should be noted that since the distance separating the opposing inner faces of transparent plates 24 and 26 is small (thickness of gasket member 20), these surfaces provide an effective smooth laminar flow path over which the liquid stream is transmitted. By virtue of this laminar flow characteristic, turbulence of the liquid stream as it passes through the analyzing chamber is substantially eliminated. Moreover, due to the narrow cross-section or thickness of the analytical chamber, air bubbles contained in the liquid stream are easily swept through the chamber so that they do not interfere with the colorimetric examination of the flowing liquid stream. By way of example, an analyzing chamber having a thickness of around .020 inch and oval dimensions of around ½ inch long by ⅛ inch wide has been found to operate satisfactorily in practice.

The flow cell assembly 12 is held within recess 16 of holder 14 by coverplate 18 so that its vertical orientated edges are flush with the vertical extending sides of the recess 16 and the outer face of transparent window 26 rests flush against the back surface of recess 16. Coverplate 18 is securely fastened to holder 14 by suitable screws (not shown) which extend through holes 36 provided in coverplate 18 and screw into internally threaded holes 38 formed in holder 14. By tightening these screws coverplate 18 compresses the components of cell assembly 12 together within recess 16 to firmly hold gasket member 20 and O-ring 28 between transparent plates 24 and 26.

Figure 3:
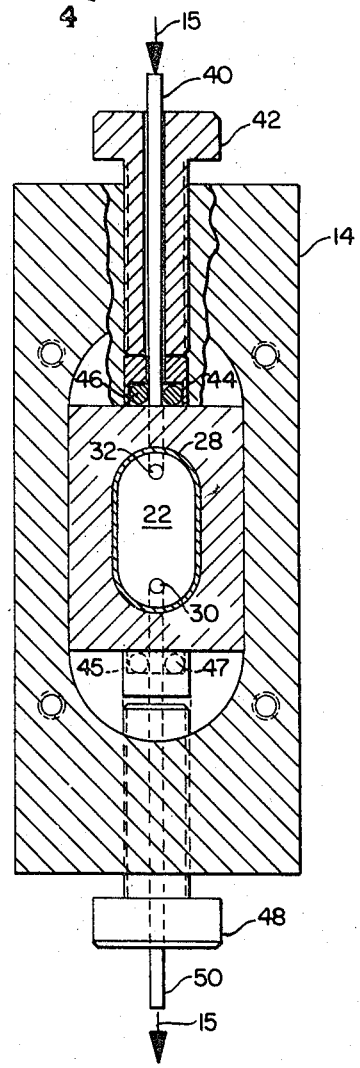
FIG. 3 is a vertical cross-sectional view of the assembled flow cell and housing taken along lines 3—3 of FIG. 2 with the upper portion of the housing partially cut away to show in detail the means for introducing the flowing liquid stream into the analyzing chamber.
Figure 4:
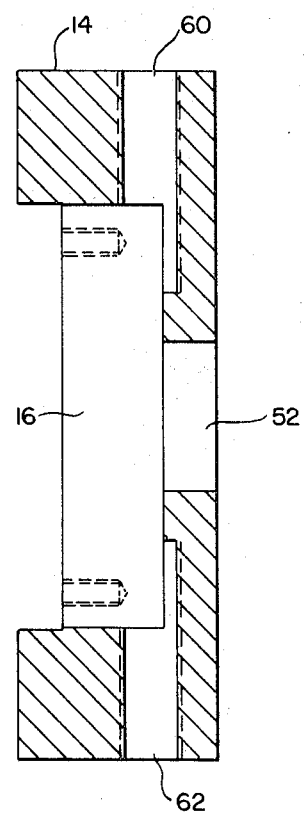
FIG. 4 is a cross-sectional view taken along lines 4—4 of FIG. 3 illustrating the holder portion of the housing.

As may be readily seen from inspection of FIG. 3, the liquid stream may be introduced into and removed from the flow cell analyzing chamber by a pair of tubular conduits 40 and 50, respectively. Each conduit is inserted through an axial bore provided in diametrically disposed clamping screws 42 and 48 which screws in turn are accommodated by internally threaded bores 60 and 62 (FIG. 4) formed in the top and bottom portions, respectively, of holder 14. Tubular conduit 40 extends downwardly into inlet passageway 32 while tubular conduit 50 extends upwardly into outlet passageway 30 to form together with the analyzing chamber (aperture 22) a continuous flow path through which the liquid stream being examined is transmitted in a downward direction as indicated by the arrows shown in FIG. 3. Of course, it will be appreciated that the liquid stream may be transmitted through the flow cell in either direction. In fact, in practice the liquid stream is preferably transmitted in a vertical upward direction to assist clearing of air bubbles which, being lighter than the liquid, tend to rise vertically upward.

A bushing 44 carrying an O-ring 46 surrounds tubular conduit 40 and is interposed between clamping screw 42 and the upper edge of transparent plate 26 to form a seal between conduit 40 and inlet passageway 32 to prevent liquid leakage at this junction. This liquid-tight seal is effected by rotating clamping screw 42 to press the bushing and O-ring combination 44 and 46 tightly against the upper edge of transparent plate 26. A similar liquid-tight seal is formed between the outlet passageway 30 and tubular conduit 50 by an identical bushing and O-ring combination 45 and 47 interposed between clamping screw 48 and the bottom edge of transparent plate 26.

Housing 10 is also provided with a pair of generally oval axially aligned apertures 52 and 54 one of which is formed in the back surface of recess 16 and the other of which is formed in coverplate 18. Apertures 52 and 54 are axially aligned with the analyzing chamber (aperture 22) as well as with each other to provide a continuous light path which is orthogonal to the direction of liquid flow through the analyzing chamber. That is to say, a light beam of a selected wavelength is transmitted through the analyzing chamber by way of apertures 52 and 54 to monitor the liquid stream. Accordingly, the light path length of the flow cell assembly is governed by the thickness of the gasket member 20. It should be noted that in addition to being of similar shape the size (vertical cross sectional area) of the apertures 52 and 54 is preferably equal to that of the analyzing chamber to expose the latter to a maximum amount of light and increase the final signal to noise ratio of the system.

Numerous modifications and departures from the specific apparatus described herein may be made by those skilled in the art without departing from the inventive concept of the invention. For instance, the cuvette housing may be cylindrical or some other suitable shape. Accordingly, the invention is to be construed as limited only by the spirit and scope of the appended claims.

What is claimed is:

1. A high pressure flow-through cuvette assembly for monitoring a continuous flowing liquid stream comprising:
   first and second transparent plates;
   a narrow gasket member having an oval-shaped aperture sandwiched between said transparent plates;
   an O-ring seal disposed about the periphery of said aperture whereby the oval-shaped aperture is bounded on either side by the inner faces of said transparent plates and about its periphery by an O-ring seal to define an analyzing chamber having a thickness defined by the thickness of said narrow gasket member;
   one of said transparent plates including inlet and outlet passageways communicating with opposite ends of said analyzing chamber to define a direct flow path for the liquid stream;
   a housing including a first member having a recess therein for receiving the sandwiched assembly and a second member covering said recess and secured to said first member to compress said transparent plates together to firmly hold said gasket member and O-ring seal between said plates;
   said housing including a pair of oval-shaped apertures each having a vertical cross sectional area at least as great as that of the analyzing chamber and axially aligned with each other and said analyzing chamber to form an optical path orthogonal to the direction of liquid flow through the analyzing chamber; and
   first and second means communicating with said inlet and outlet passageways, respectively, for transmitting the liquid stream to and from the analyzing chamber as a continuous flowing liquid stream.

2. A high pressure flow-through cuvette assembly as claimed in claim 1 comprising in addition first and second sealing means sealing said first and second liquid transmitting means to said inlet and outlet passageways, respectively.

References Cited

UNITED STATES PATENTS

| | | | |
|---|---|---|---|
| 2,819,402 | 1/1958 | Watson et al. | 356—246X |
| 3,090,861 | 5/1963 | Haenni | 356—246X |
| 3,391,598 | 7/1968 | De Grave, Jr., et al. | 356—246 |

RONALD L. WIBERT, Primary Examiner

W. A. SKLAR, Assistant Examiner

U.S. Cl. X.R.

250—218